June 10, 1958 C. F. A. RIBEYRE 2,838,613
RINGING SIGNAL RECEIVER INCLUDING NON-LINEAR
ELEMENTS FOR TELECOMMUNICATION SYSTEMS
Filed Dec. 2, 1954 2 Sheets-Sheet 1

June 10, 1958 C. F. A. RIBEYRE 2,838,613

RINGING SIGNAL RECEIVER INCLUDING NON-LINEAR ELEMENTS FOR TELECOMMUNICATION SYSTEMS

Filed Dec. 2, 1954 2 Sheets-Sheet 2

2,838,613

Patented June 10, 1958

2,838,613

RINGING SIGNAL RECEIVER INCLUDING NON-LINEAR ELEMENTS FOR TELECOMMUNICATION SYSTEMS

Claude Francois Armand Ribeyre, Paris, France, assignor to Lignes Telegraphiques & Telephoniques, Paris, France Application December 2, 1954, Serial No. 472,694

Claims priority, application France December 22, 1953

6 Claims. (Cl. 179—84)

The present invention relates to receiving devices for ringing signals of telecommunication systems and is applicable to cases where ringing signals are transmitted at a single frequency outside the frequency band of the communication currents (for instance speech currents).

It is known that in such receivers, in particular those for which the same amplifier tube is used for amplifying the ringing currents and the speech signals and which use a negative feedback for the ringing signals, difficulties occur in practice, such as the following:

(1) It is not possible to obtain a sharp threshold level of operation, i. e. a rapid variation of the anode current through the tube for a predetermined level of the signal received, this uncertainty in the operating threshold being related to the negative feedback inherent to the very principle of the receiver.

(2) Low level pilot currents, with frequencies close to that of the ringing signal are liable to disturb the conversation and the operation of the ringing receiver device.

The devices according to the invention make it possible to obviate these drawbacks. Their principle of operation consists in causing the direct current of the amplifier tube to decrease the attenuation of a selective network traversed by the ringing signals, this network having maximum attenuation for low level currents and its attenuation being rapidly decreased under the action of the variation of the said direct current when higher level currents at the ringing frequency are received.

The invention will now be explained in its application to telephone communication systems, and with reference to the appended drawings.

Figure 1:
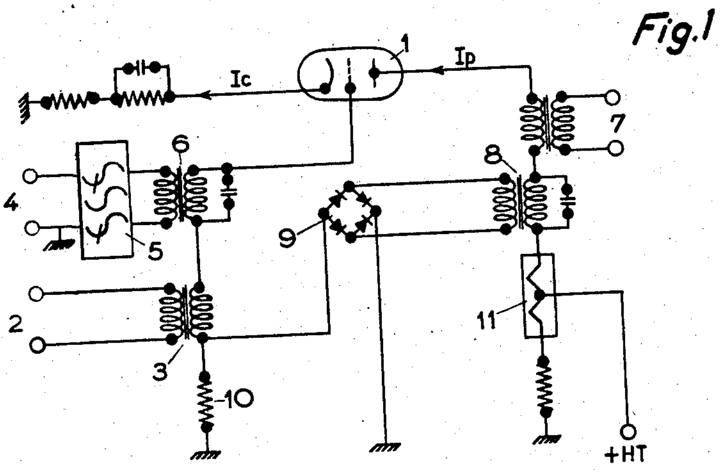
Figure 1 shows a ringing signal receiver of a known type for a telecommunication system.

Figure 1 represents an example of a conventional receiving circuit for ringing signals in a telecommunication system in which an amplifier tube 1, indicated by way of example as a triode is used for amplifying the speech currents which arrive at terminals 2 and are transmitted by the transformer 3, and the ringing signals which arrive at terminals 4 and are transmitted through the filter 5, tuned to the frequency of the ringing signals and the transformer 6. The speech currents after amplification, are transmitted to terminals 7.

Figure 2:
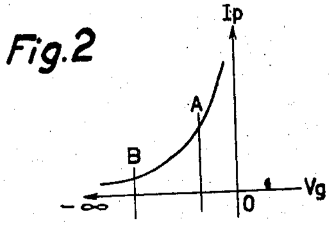
Figures 2 and 3 show the anode current through the amplifier tube of the said receiver as a function of the control grid voltage and of the level of the signal received at the input to the device, for a receiver of the type of Fig. 1.

The ringing signal, at 8 kilocycles per second for instance, is amplified by the tube 1, transmitted by the transformer 8 to the rectifier bridge 9, which delivers a rectified, direct voltage which is applied to the grid resistance 10 of the tube 1, in such a manner that the negative bias of the control grid of the tube increases in absolute value; in Figure 2 which shows the anode current $I_p$ as a function of the control grid bias voltage $V_g$, the working point thus passes from A to B. In a given example of a receiver, the anode current which was 7.5 ma. becomes about 1 ma.

The receiving relay 11 for the ringing signals comprises two windings wound in opposite directions. The anode current of the tube 1 flows through one of the windings of the relay 11 and a compensation current flows through the other winding, the compensation current being equal to 8 ma. in the example considered. When the anode current through the tube 1 drops to 1 ma., the relay operates and closes contacts which cause a ringing circuit (or other signalling device) to operate.

Figure 3:
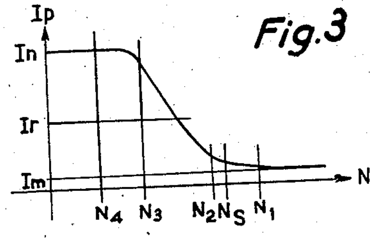

Figure 3 represents the anode current versus the level N of the signal received at the input 4 of ringing signal receiver. $I_n$ is the normal value of the anode current, $I_m$ the minimum value of the anode current when a ringing signal is received, $I_r$ the anode current which corresponds to a release of the relay 11. In this figure, as well as in Figure 6, the levels $N_1$, $N_2$ limit the zone of correct operation and the levels $N_3$ and $N_4$ limit the zone of the low distributing levels. The position of the operating zone for the input signals is determined from the following contradictory conditions:

(1) The signal distortion should be a minimum, i. e. the differences in the values of the anode currents corresponding to the extreme possible limits of the useful signal levels should be as low as possible; there is thus an advantage in making the operating zone correspond to comparatively low signal levels.

(2) Low level disturbing signal currents should not appreciably decrease the anode current, and should not cause noise. There is an advantage therefore in shifting the operating zone towards higher signal levels.

It is difficult to meet these two conditions at the same time in a conventional receiver. The difficulty is eliminated in the devices according to the present invention, by the non-linear way of operation which results in sharper discrimination between low and high signal levels.

Figure 4:
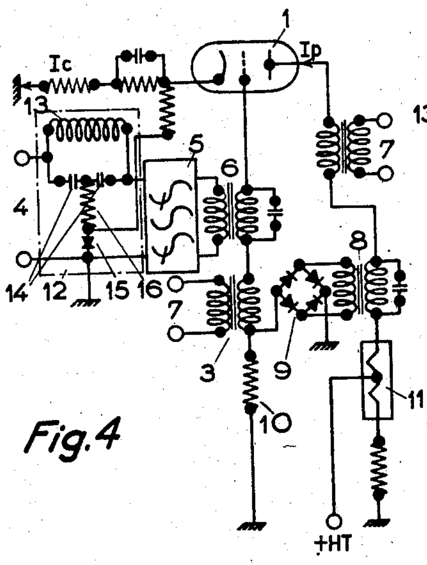
Figure 4 illustrates a ringing receiver according to the present invention.

In the device of Fig. 4, there is inserted, between the input terminals 4, at which the ringing signal is received and the filter 5, which plays the same part as the corresponding filter of Fig. 1, a network 12 comprising, in series, a selective circuit consisting of an inductance 13 and two condensers 14 and, in shunt, a non-linear or rectifier element 15 in series with a resistance 16. One point of this network is connected with the cathode of the tube 1, in such a manner that the non-linear element is traversed by the cathode current of said tube. A modification of this device is shown in Figure 5; the resistance 16 of the network 12 has been omitted in the network 17 and a resistance 18 has been placed in series with the inductance 13.

Figure 5:
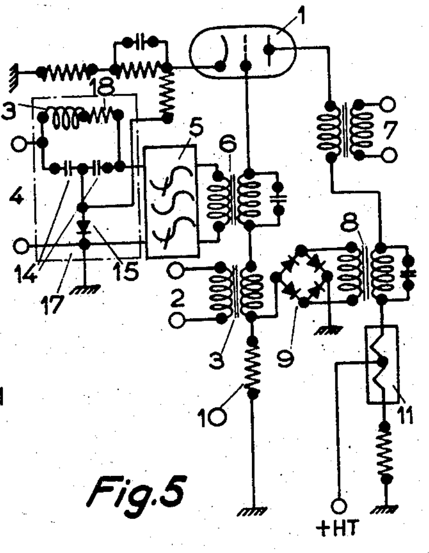
Figure 5 shows a modified embodiment of the receiver shown in Fig. 4.
Figure 6:
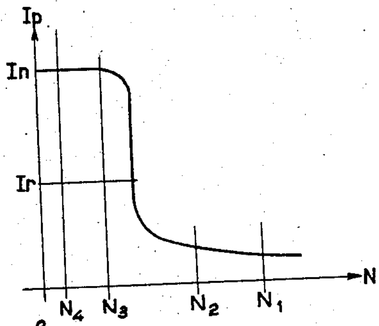
Figure 6 shows a curve representing the anode current versus the input level for a receiver using a circuit according to Figure 5.

The curve which would represent the anode current $I_p$ versus the level N′ of the signal applied to the terminals of the primary winding of the transformer 6 of the device of Fig. 5 is similar to the curve of Fig. 3 while that representing $I_p$ as a function of N is different and is shown in Figure 6. When N decreases from its high initial value $N_1$ (Fig. 3), N' also decreases and $I_p$ increases substantially when N falls below the level $N_s$ (Fig. 3). The resistance of the biased rectifier 15 (Fig. 4 or 5) decreases and the attenuation of the network 17 increases; there results a further decrease of N' and consequently an increase of $I_p$, and so on. The feedback thus started is stabilized only when $I_p = I_n$. The difficulties mentioned in connection with the device of Fig. 1 disappear. In addition, the signals at disturbing frequencies need be attenuated only down to the level $N_s$ by the filter 5.

Figure 7:
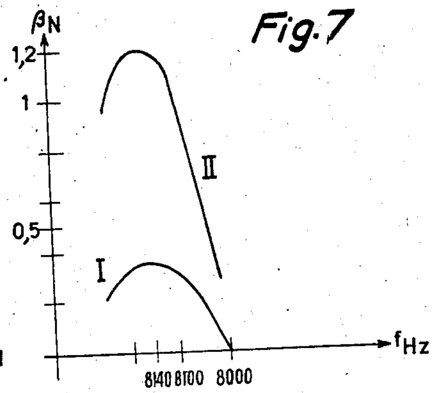
Figure 7 shows the attenuation curves for a receiver using a circuit according to Figure 4.

In Fig. 7 the attenuation $\beta$ of the network 12 is shown as a function of the frequency $f$, taking the level N as a parameter (the attenuation being measured for the network 12 placed between two fixed resistances for instance).

The network 12 is intended to act as a narrow band elimination filter for eliminating a pilot frequency 8,140 c./s. close to the ringing frequency 8000 c./s.

The curve I is relative to a high level 8000 c./s. ringing current without the presence of 8140 c./s. current; $I_p$ is approximately equal to 1 ma. The bias of the rectifier is very low and the network 12 has no appreciable action.

The curve II relates to the case when there is no ringing current, but a residual carrier of 8000 c./s. at a low level, and a 8140 c./s. pilot current, also at a low level; $I_p$ is approximately equal to 7.5 ma. The bias of the rectifier is maximum and the network 12 operates.

Figures 8, 9, 10:
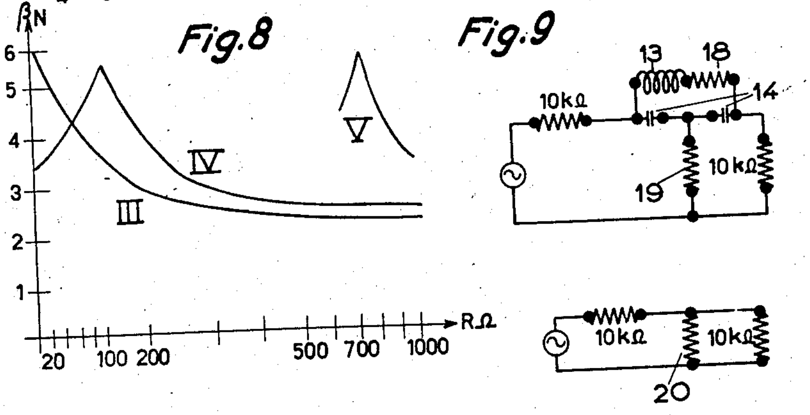
Figure 8 shows attenuation curves of devices with selective circuits and aperiodic circuits.
Figure 9 shows, diagrammatically, a modified embodiment of the selective network of the receiver shown in Fig. 5.
Figure 10 represents diagrammatically; an aperiodic circuit device.

In the device of Fig. 5, the resistance 18 inserted in series with the inductance 13 has the effect of making the attenuation substantially uniform in a frequency band close to that of the ringing current which is substantially equal to the resonance frequency of the antiresonant circuit formed by the connection in parallel of the inductance 13 and the two condensers 14 in series. In order to show that the attenuation difference corresponding to a high level and to a low level, is larger in the case of a selective circuit than in the case of an aperiodic circuit, there are shown in Fig. 8, attenuation curves corresponding to the network in Fig. 9, which is the network 17 of Fig. 5 placed between two fixed resistances of ten kilohms and in which the rectifier 15 is replaced by a resistance 19, and to the network of Fig. 10 in which a resistance 20 is placed in shunt between two ten kilohms resistances. The attenuation curves in nepers are plotted versus the value R, in ohms, for the resistances 19 and 20.

The curve III corresponds to the network of Fig. 10, the curves IV and V to the network of Fig. 9, the curve IV to the case when the resistance 18 is 300 ohms, and the curve V to the case when it is 50 ohms.

Figure 11:
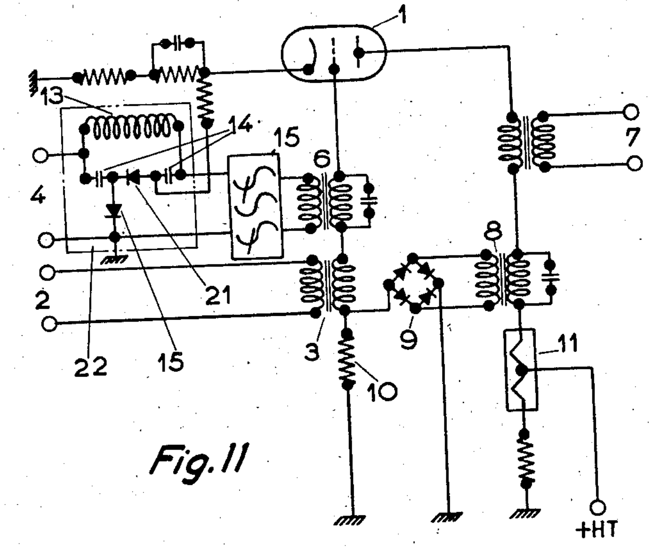
Figure 11 shows another example of the circuit according to the invention.

The device of Fig. 5 presents a drawback in the case of the reception of a train of coded pulses. The releasing of the network 17 is not immediate and the variation of the anode current is not a reproduction of that of the received signal. This drawback is obviated by using the device of Fig. 11, in which the presence of the rectifier 21 in series with the capacities 14 in the network 22 allows a satisfactory reproduction of the current. Otherwise, the characteristics of the device of Fig. 11 are comparable to those of the device of Fig. 5, although the threshold of operation is slightly less sharply defined. It may be indicated, for example there has been obtained, for a high ringing level corresponding to a cathode current $I_c$ of one milliampere an attenuation of 0.1 neper and for a low level ($I_c$=9 ma.) attenuation of 1.1 neper for the network 22 of Fig. 11.

What I claim is:

1. A receiver for ringing signals of a telecommunication system in which said ringing signals are transmitted at a predetermined frequency comprising, in combination, an electron tube having at least a cathode, a control grid and an anode, a relay energized by anode current of said tube, frequency selective means for applying ringing signal voltages to said control grid, a tuned circuit tuned at said frequency and inserted in the anode circuit of said tube, means for rectifying voltage developed across said circuit and for applying said rectified voltage to said control grid so as to control the value of the cathode direct-current of said tube, a fixed resistance traversed by said cathode direct-current, a selective network included in said frequency selective means and having maximum attenuation at a frequency about equal to said predetermined frequency, at least one non-linear resistance in said network, the value of said maximum attenuation depending on that of said non-linear resistance, and means for applying the direct current voltage developed across said fixed resistance to said non-linear resistance in such direction that the attenuation of said network be decreased when said cathode direct-current changes under the action of said rectified voltage.

2. A receiver as claimed in claim 1, wherein said network is a bridged-T network including a series inductance, two condensers and a shunt branch comprising a non-linear resistance.

3. A receiver as claimed in claim 2, wherein a further fixed resistance is connected in series with said inductance so as to decrease the selectivity of said network.

4. A receiver as claimed in claim 2, wherein said network comprises a further non-linear resistance the value of which is modified under the action of said direct-current voltage.

5. A receiver as claimed in claim 4, wherein said further non-linear resistance is connected in series with one of said condensers.

6. A receiver for a signal of predetermined frequency comprising an electron tube with a cathode, grid and anode, a utilization device coupled to said anode, frequency selective means for applying the signal to said grid, filter means tuned to the predetermined frequency in the anode circuit of said electron tube, means for rectifying a voltage at said filter means coupled to said grid to provide direct current bias at said grid, a cathode resistor coupled to said cathode, attenuating means in said frequency selective means providing maximum attenuation at substantially the predetermined frequency, and a non-linear impedance in said attenuating means coupled to said cathode resistor for controlling the value of the maximum attenuation.

References Cited in the file of this patent

UNITED STATES PATENTS

| | | |
|---|---|---|
| 2,535,104 | Van Mierlo | Dec. 26, 1950 |
| 2,654,002 | Hooijkamp | Sept. 29, 1953 |
| 2,658,112 | Davison et al. | Nov. 3, 1953 |
| 2,686,227 | Ryall | Aug. 10, 1954 |